(12) United States Patent
Adam

(10) Patent No.: US 7,573,391 B2
(45) Date of Patent: Aug. 11, 2009

(54) ROTATION SENSOR WITH TEMPERATURE MEASURING FEATURE

(75) Inventor: Christian Adam, Colmar (FR)

(73) Assignee: The Timken Company, Canton, OH (US)

( * ) Notice: Subject to any disclaimer, the term of this patent is extended or adjusted under 35 U.S.C. 154(b) by 679 days.

(21) Appl. No.: 10/575,397

(22) PCT Filed: Oct. 14, 2003

(86) PCT No.: PCT/US03/32692

§ 371 (c)(1),
(2), (4) Date: Apr. 7, 2006

(87) PCT Pub. No.: WO2005/047838

PCT Pub. Date: May 26, 2005

(65) Prior Publication Data

US 2007/0129908 A1    Jun. 7, 2007

(51) Int. Cl.
*G08B 17/00* (2006.01)
*G08B 23/00* (2006.01)
*G08B 21/00* (2006.01)
*H01L 35/00* (2006.01)

(52) U.S. Cl. ............... 340/584; 340/501; 340/449; 340/588; 340/636.18; 327/512

(58) Field of Classification Search ............... None
See application file for complete search history.

(56) References Cited

U.S. PATENT DOCUMENTS

| 5,200,697 | A | 4/1993 | Adler et al. |
| 5,381,090 | A | 1/1995 | Adler et al. |
| 6,512,365 | B1 | 1/2003 | Karpinski |
| 6,828,779 | B2 * | 12/2004 | Townsend et al. ...... 324/207.12 |
| 6,853,237 | B2 * | 2/2005 | Murakami et al. .......... 327/512 |
| 2002/0067176 | A1 * | 6/2002 | Townsend et al. ........... 324/721 |
| 2006/0005619 | A1 * | 1/2006 | Renninger et al. ....... 73/204.15 |

FOREIGN PATENT DOCUMENTS

DE    4431045    3/1996

OTHER PUBLICATIONS

Search Report corresponding to International Application No. PCT/US03/32692.

* cited by examiner

*Primary Examiner*—Daniel Wu
*Assistant Examiner*—Fekadeselassie Girma
(74) *Attorney, Agent, or Firm*—Polster, Lieder, Woodruff & Lucchesi, L.C.

(57) ABSTRACT

A temperature sensing system (100) for use with a variable reluctance sensor such as found in vehicle wheel bearing applications, which utilizes existing sensors (12) such as the antilock braking system or traction control system sensors as a direct current resistive temperature gauge. The temperature sensing system (100) includes electrical components (R4, C1) configured to separate the DC voltage (VDC(t)) representative of sensor temperature from the original magnetically induced AC voltage output signal (VSN1(t)) representative of the rotation such as vehicle wheel speed, thereby permitting the temperature sensing system (100) to be retrofitted and installed in vehicles or other components without significant alteration to an existing wiring harness or electrical components.

17 Claims, 4 Drawing Sheets

VOLTAGE AT SENSING NODE SN4:
PURE ABS AC SIGNAL

THIS IS THE ABS SIGNAL

VOLTAGE AT SENSING NODE 2
VERSUS GROUND:
DC CONSTANT BIAS SIGNAL

ROTATION SENSOR WITH TEMPERATURE MEASURING FEATURE

CROSS REFERENCE TO RELATED APPLICATIONS

The present application is a national stage application related to, and claiming priority from, International Application No. PCT/US03/032692 filed on Oct. 14, 2003, and which is herein incorporated by reference.

TECHNICAL FIELD

The present invention relates generally to methods and apparatus for acquiring temperature information in the proximity of a variable reluctance sensor, for example a rotation sensor associated with the bearings of a vehicle wheel, and in particular, to a method and apparatus for utilizing the properties of the variable reluctance sensor, such as a vehicle anti-lock braking system passive sensor located inside a vehicle wheel bearing, to provide a temperature dependant signal representative of the temperature at the variable reluctance sensor location.

BACKGROUND ART

Many automotive vehicle of current manufacture come equipped with antilock braking systems and some with traction control systems as well. In a vehicle so equipped, the systems monitor the rotation of some, if not all, of the wheels—and certainly, the front wheels which steer the vehicle. Should a wheel begin to slip when the brakes are applied, as could well occur if the wheel encounters snow or ice, the antilock braking system will detect the loss of velocity and relax the braking forces on that wheel. This allows the wheel to continue to rotate and enables the driver to maintain better control over the vehicle. On the other hand, if one of the driving wheels encounters slippery pavement and as a consequence loses traction, the traction control system will apply a braking force to that wheel, and this has the effect of transferring the torque to the opposite wheel which perhaps has better traction.

An antilock braking system or traction control system for a vehicle thus requires speed sensors to monitor the rotation of some, if not all, wheels on the vehicle. While a variety of locations exist on a vehicle for installation of a speed sensor for a wheel, perhaps the best is in the housing that contains the bearing on which the wheel, or more accurately, the hub for the wheel, rotates. This keeps much of the sensor isolated from contaminates and objects that might otherwise damage it or disrupt its operation. In this regard, the typical sensor of this type fits into a cylindrical hole in the housing and has a stationary probe which is presented toward a target wheel or "tone ring" that rotates with the road wheel and contains discontinuities, such as teeth, which the sensor detects as the target wheel revolves. The result is a pulsating signal which reflects the angular velocity of the wheel. A control system monitors the signals from the wheel and initiates braking to achieve the results desired. These types of rotation sensors, commonly referred to as variable reluctance sensors, are found in a variety of applications, including gearboxes, drive shafts, and motors.

Typically, the due to the close proximity to the rotating or moving components required for proper functioning of a variable reluctance sensor, the sensor is exposed to the ambient temperature of the components. It is well known that the ambient temperatures of the components, such as within a vehicle wheel bearing housing or transmission are a good representation of the condition of the components. For example, a loss of lubricant or other cause of high friction, such as a contaminate or bearing failure, will result in an increase in component temperatures. In a vehicle wheel bearing application, an increase in wheel bearing temperatures may be caused by a significant application of vehicle brakes, either in a short and hard panic stop, or in a long and continuous fashion, such as regulating a vehicle's speed when descending a steep grade. Monitoring the temperatures of the components, such as the vehicle wheel bearings, provides useful information to a driver, and to a vehicle ECU, permitting early detection of possible damage, providing warnings, or permitting corrective actions to be taken.

Conventional systems to measure vehicle wheel bearing temperature utilize a separate temperature sensor placed in operative relationship to the vehicle wheel bearing, and which are coupled to the vehicle ECU or temperature warning components. In addition to requiring a separate sensor disposed in the vehicle wheel bearing or housing, this classical solution requires a separate electrical circuit for the temperature sensor signals, resulting in an increase in cost and additional susceptibility to wear or damage.

Systems which utilize properties of the antilock braking system or traction control system to provide a signal representative of vehicle wheel bearing temperature, such as shown in U.S. Pat. No. 5,381,090 to Adler et al. are known. In the '090 Adler et al. patent, the changes in direct current electrical resistance of the speed sensor windings responsive to the temperature of the associated wheel bearing and components are measured by applying a voltage to the speed sensor windings. The resulting output signal is a combination of the magnetically induced AC voltage representative of the vehicle wheel speed, and a DC voltage representative of temperature. Additional circuit components, including particularly active components are provided to filter the resulting output signal and provide a modified output signal in the form of a square wave output having a frequency related to vehicle wheel speed, together with a separate DC voltage for enabling temperature sensing.

It would be advantageous to provide a temperature sensing system for use in conjunction with existing variable reluctance sensors, such as those found in vehicle wheel bearings. A temperature sensing system utilized with existing vehicle antilock braking system (ABS) or traction control (TC) system passive variable reluctance sensors, which does not modify the magnetically induced AC voltage output signals which are representative of the vehicle wheel speed, would permit a bearing temperature sensing system to be retrofitted and installed inside the vehicle wheel bearings of vehicles without significant alteration to the vehicle wiring harness and electrical components. It would be particularly advantageous for applications where the ABS passive variable reluctance sensor is located inside the vehicle wheel bearing, as the temperature of the passive variable reluctance sensor correlates with the bearing internal temperature, permitting accurate monitoring of the bearing temperature.

SUMMARY OF THE INVENTION

Briefly stated, the present invention provides a temperature sensing system for use with existing passive variable reluctance sensors, for example those associated with vehicle wheel bearings which utilizes an antilock braking system or traction control system, as a direct current resistive temperature gauge. The temperature sensing system further includes electrical components configured to separate the DC voltage representative of sensor temperature from the magnetically induced AC voltage output signals representative of the vehicle wheel speed, thereby permitting the temperature sensing system to be retrofitted and installed in vehicles without significant alteration to the vehicle wiring harness and electrical components, such as by insertion in between two connectors of an existing vehicle wiring harness.

In one embodiment of the present invention, the temperature sensing system includes an constant voltage source, such as a voltage regulator, operatively coupled to the antilock braking system or traction control system existing sensor through a Wheatstone bridge circuit. Selection of resistors placed in the Wheatstone bridge circuit permit a bias adjustment of a DC voltage representative of sensed temperature. A first filter circuit is coupled to one node of the Wheatstone bridge circuit to provide the magnetically induced AC voltage output signals representative of the vehicle wheel speed, while a second filter circuit is coupled between a pair of nodes of the Wheatstone bridge circuit to provide the DC voltage output signal representative of the sensed temperature.

In an alternate embodiment of the present invention, the temperature sensing system includes an constant voltage source, such as a Zener diode, operatively coupled to the antilock braking system or traction control system existing sensor through the Wheatstone bridge circuit.

In an alternate embodiment of the present invention, the temperature sensing system includes an constant voltage source, such as a voltage regulator, operatively coupled to the antilock braking system or traction control system existing sensor through a Wheatstone bridge circuit. Selection of resistors placed in the Wheatstone bridge circuit permits a bias adjustment of a DC voltage representative of sensed temperature. A filter circuit is coupled to one node of the Wheatstone bridge circuit to provide the magnetically induced AC voltage output signals representative of the vehicle wheel speed, while a comparator circuit is coupled between a pair of nodes of the Wheatstone bridge circuit to provide a temperature limit warning signal to a vehicle operator for example, on a special display on the vehicle dashboard.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

BEST MODE FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
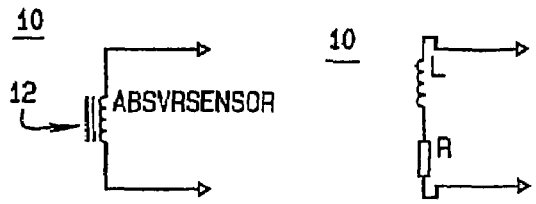
FIG. 1 is an electrical schematic of a conventional wheel speed sensor unit.
Figure 2:
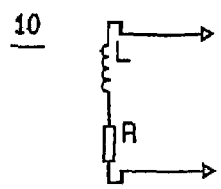
FIG. 2 is an electrical schematic of an idealized representation of a conventional wheel speed sensor unit, illustrating a real coil as a pure coil in serial with a pure resistor.
Figure 3:
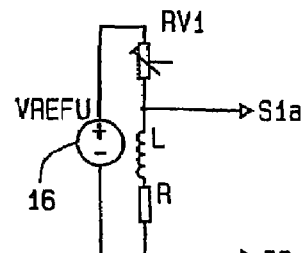
FIG. 3 is a simplified electrical schematic representation of a constant voltage source coupled to the wheel speed sensor unit of FIG. 2 using a drop resistor.

Turning to FIGS. 1-3, a speed sensor 10 includes a stationary probe 12 which is presented toward a target wheel or "tone ring" (not shown) that rotates with a road wheel and contains discontinuities, such as teeth, which the stationary probe 12 detects as the target wheel revolves. The result is a pulsating signal, which reflects the angular velocity of the wheel.

Conventional stationary probes 12 are variable reluctance sensors consisting of a coil with a magnetic core. As the tone ring rotates in front of the magnetic core, and the alternation of discontinuities changes the magnetic flux lines, a resulting alternating current induces a voltage in the coil. This voltage has a frequency corresponding to the number of discontinuities passing the stationary probe 12 per second, and can be related to the angular speed of the vehicle wheel or to the speed of the vehicle.

As shown specifically in FIG. 2, the stationary probe 12 can be represented by a pure coil L in series with a pure resistor R, having a temperature dependence coefficient. To monitor the temperature of the stationary probe 12, it is known to superimpose to the magnetically induced AC voltage signal a DC signal that varies with the temperature of the stationary probe 12. As is described generally in U.S. Pat. No. 5,381,090 to Adler, et al., this may be done by wiring a voltage source 16, as shown in FIG. 3, to the stationary probe 12.

In FIG. 3 a constant voltage source 16 is shown coupled to the wheel speed sensor unit of FIG. 2 using a drop resistor RV1. The drop resistor RV1 is preferably adjustable to accommodate sensor resistance tolerances. Since the resistance value R of the coil is highly and linearly temperature dependant, the DC voltage at node SN1 is correspondingly temperature dependant. Furthermore at SN1, the AC component voltage provides the conventional ABS signal. Hence, a DC temperature dependant voltage is superposed with the AC ABS signal from the coil L of the passive variable reluctance sensor when tone wheel rotates.

Figure 4:
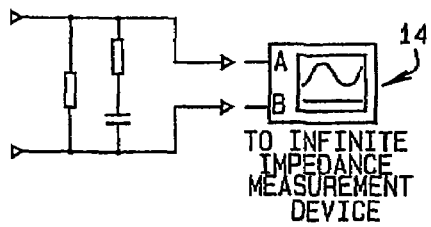
FIG. 4 is a representation of an input stage to an electronic control unit, illustrating a circuit with a finite impedance resulting in a voltage drop in conjunction with a sensor source impedance.

The AC ABS signal extracted from the superimposed signals is passed to the ABS electronic control unit (ECU) input, or more generally, to the electronic circuits associated with the variable reluctance signal output. The ECU input typically has a finite signal impedance, and therefore influences the signal voltage level. For example, FIG. 4 illustrates a simplified circuit that is equivalent, from a input impedance point of view, to the input stage of a given ECU (in this case, the input impedance is frequency dependant).

In order to generate a sufficiently large induced voltage in the stationary probe 12, the probe consists of an electrical conductive winding of a small diameter wire having a high number of windings and therefore presenting a high ohmic resistance in the range of 0.5 kΩ to several kΩ. It is well known that this resistance is highly linearly temperature dependent within selected temperature ranges. Further, the temperature dependence is characterized by the material thermal resistivity coefficient α, expressed as μΩ/Ω×° C., or μΩ/Ω×° F. The ohmic resistance R at a temperature t is given by:

$$R(t) = R_{ta}(1 + \alpha(t - ta)) \quad \text{Equation (1)}$$

where $R_{ta}$ is the resistance at ambient temperature (20° C. or 70° F.) and ta is the ambient temperature. Hence, a measurement of the resistance of the stationary probe 12, either directly or indirectly, when the speed sensor 10 is operational, will provide information related to the temperature of the stationary probe 12. When the stationary probe 12 is located in proximity to a point of interest, i.e., the interior of a wheel bearing or a gear box, or any general application, the provided temperature is closely related to the temperature of the point of interest.

Figure 5:
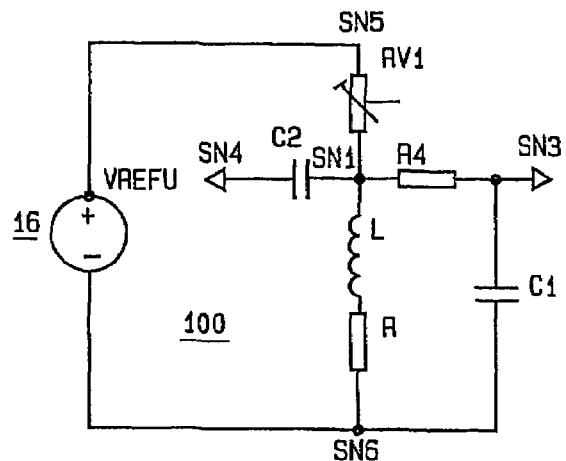
FIG. 5 is a representation of a circuit of the present invention configured to separate an AC ABS signal from a superimposed DC temperature signal at node S1a of FIG. 3.
Figure 6:
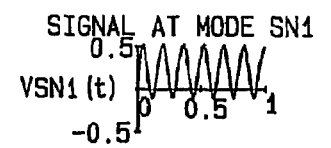
FIG. 6 is a representation of a superimposed temperature dependant DC voltage signal on a magnetically induced AC voltage signal output from the wheel speed sensor at sensing node SN1 of FIG. 5.
Figure 6:
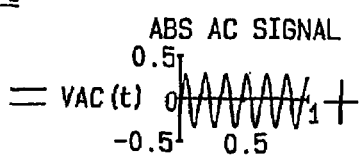
Figure 6:
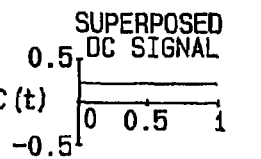

Turning to FIG. 5, in an embodiment 100 of the present invention, the voltage signals at sensing node SN1, shown in FIG. 6, represent a superposition of the DC temperature dependant signal and the AC in the coil induced voltage. To analyze and use both pieces of information, each signal is separated to provide a pure DC signal to analyze the sensor coil temperature and a pure AC signal to feed the ABS ECU. Components used to separate the superimposed AC voltage (ABS information) from the DC voltage (temperature information) at node SN1 define two filters. The first filter, consisting of resistor R4 coupled between nodes SN1 and SN3, and a capacitor C1 coupled between nodes SN3 and SN6, provides a pure DC voltage, independent from the alternating current ABS signal. The pure DC voltage signal is representative of only the temperature information.

Figure 7:
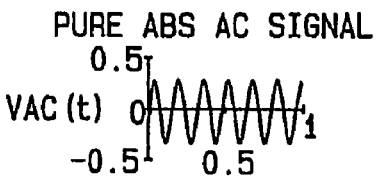
FIG. 7 is a representation of the magnetically induced AC voltage signal extracted from a capacitive filter circuit coupled to sensing node SN4 of FIG. 5.

A second filter consisting of a second capacitor C2 provides a pure AC signal between nodes SN4 and SN1, as shown in FIG. 7. The pure AC signal is representative of the original ABS signal to be sent to the ECU. Using only passive circuit components such as resistor R4 and capacitors C1 and C2 to separate the pure AC and DC signals greatly reduces associated component costs.

Figure 9:
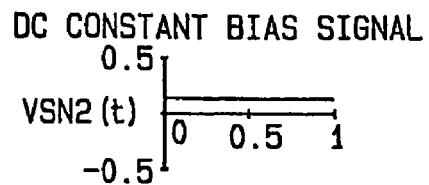
FIG. 9 is a representation of the DC constant bias signal at node SN2 of the Wheatstone bridge circuit of FIG. 8.
Figure 8:
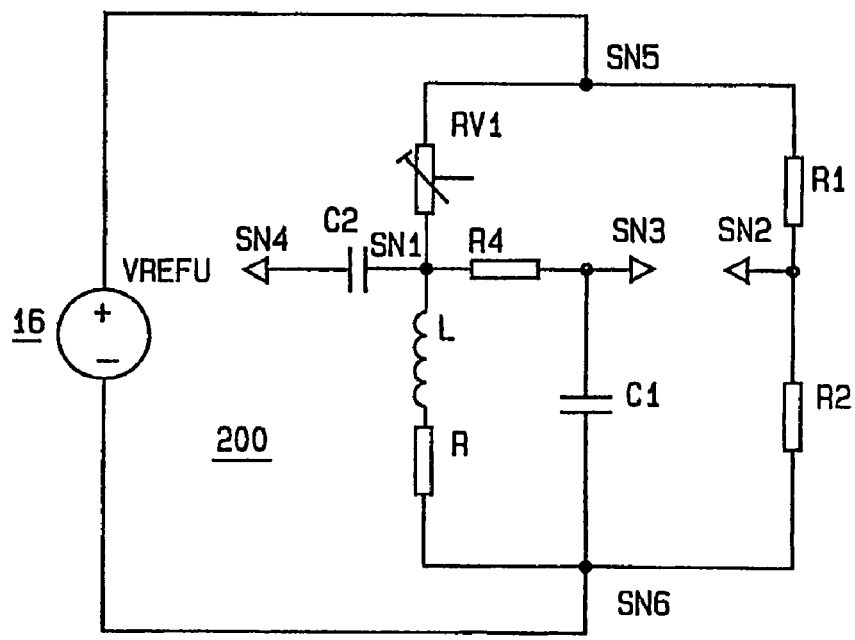
FIG. 8 is a bias setting and Wheatstone bridge alternate configuration of the circuit shown in FIG. 5.
Figure 10:
FIG. 10 is a representation of the temperature dependent DC voltage signal between two nodes SN3 and SN2 of FIG. 8.

An alternate embodiment 200 of the present invention is shown in FIG. 8. A second branch with a pair of resistors R1 and R2 is added in parallel with the voltage source 16, forming a Wheatstone bridge configuration with the variable reluctance sensor (R and L) and the resistor RV1 in a first branch, and resistors R1 and R2 in a second branch. The Wheatstone bridge wiring circuit provides the ability to establish a DC bias signal, shown in FIG. 9, for the temperature information circuit. Resistors R1, R2, and RV1 can be selected to obtain a DC voltage signal of a specific value for a specific temperature of the sensor resistor R. When the circuit 200 is used to measure the temperature of a wheel bearing or other component, the bias permits the DC voltage signals to be adjusted to obtain a 0.0 mV output at a temperature of either 0° C. or 0° F. when the temperature signal is extracted between nodes SN3 and SN2, as shown in FIG. 10. Those of ordinary skill in the art will recognize that the selected temperate may be varied to correspond with a specific application, for example, the bias may be established to correspond to a maximum permissible temperate when the device is used to monitor a temperature overlap (temperature alarm on vehicle), thereby establishing an alarm threshold.

Figure 11:
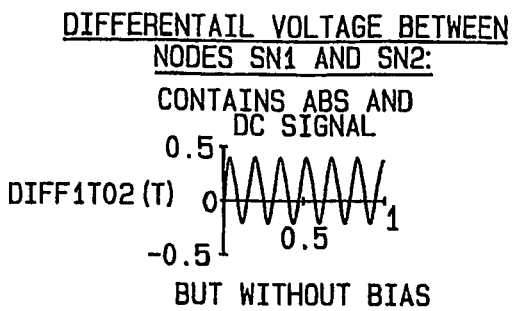
FIG. 11 is a representation of the superimposed differential voltage between two nodes SN1 and SN2 of FIG. 8.

With the configuration 200 of the present invention, shown in FIG. 8, the voltage signal present at node SN1 consists of the magnetically induces AC voltage from the stationary sensor 12 and the superimposed DC voltage which is temperature dependant, as illustrated in FIG. 11. If the voltage drop resistance value of adjustable resistor RV1 is much more greater as the resistance R of the variable reluctance sensor, the DC voltage varies quasi-linearly with the temperature of the sensor. A first filter circuit, consisting of resistor R4 and capacitor C1 is configured to remove the AC signal, such that a pure DC signal between nodes SN3 and SN2 is representative of the sensor coil temperature. A second filter circuit, consisting of capacitor C2 removes the DC component and established a pure AC ABS signal at nodes SN4 and SN6 which may be passed to the ECU.

Figure 12:
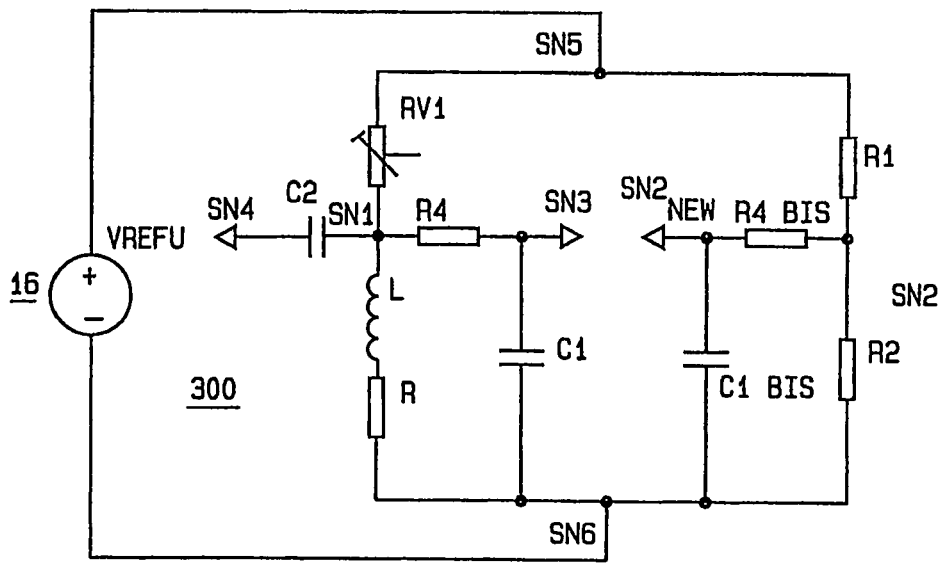
FIG. 12 is a detailed electrical schematic representation of an alternate embodiment of the present invention, including circuits to improve the signal during the switch-on phase of the voltage reference unit.

In an alternate embodiment 300, shown in FIG. 12, an additional circuit branch is inserted between SN2 and SN6. The additional circuit branch includes resistor $R4_{BIS}$ and capacitor $C1_{BIS}$ to improve signal quality at node $SN2_{new}$ between resistor $R4_{BIS}$ and capacitor $C1_{BIS}$ during the switch-on phase of voltage reference 16.

For most vehicle configurations, the voltage signal at node SN4 may be coupled directly to the vehicle ABS, TCS, or ECM. However, in some vehicle configurations, the control module receiving the speed sensor signals performs an electrical resistance check during signal measurement cycles, to detect damage to the stationary probe 12 or to the wiring circuit. To accommodate vehicles of this type, additional circuit components are shown in an alternate embodiment 400, illustrated in FIG. 13. Specifically, a resistor R6 is provided having, for example, a resistance value approximately equal to the nominal resistance value of the stationary probe 12 at the ambient temperature, permitting the ECU to check for damage in the wiring 402 leading to R6, because the capacitors C3 and C4 block DC voltage signals. Capacitor C4 may be optional, depending if ground continuity is required for the particular application in which the system is utilized.

However, with resistor R6 having roughly the same ohmic value as the sensor, the AC ABS signal voltage will drop and result in approximately a 50% reduction in the magnetically induced AC voltage signal. To compensate for the reduction caused by the addition of resistor R6, the voltage signal at node SN4 is routed through a voltage follower U2 to adapt this new load impedance. The additional capacitor C3 acts to prevent additional problems during a resistance test by the vehicle control module. An other optional capacitor C4 can be introduced for the same reasons, if galvanic insulation is desired between ECU circuit and the new electronic in front of R6. In this embodiment 400, R6 fed by the capacitors C3 and C4 with the pure AC ABS signal to function as a coil emulator, and to pass to the ECU a copy of the original magnetically induced AC ABS voltage signal from the sensor.

However, those of ordinary skill in the art will recognize that tests for correct resistance ranges performed by the ECU could fail to detect problems with the circuits disposed in front of resistor R6. To avoid this, it may be observed that in case of short-cut in the sensor coil or in his wiring 404 to nodes SN1 and SN6, the DC temperature signal between nodes SN3 and SN2 will reach a negative value outside of a predetermined range. The same situation would occurs if the coil or the associated wiring to nodes SN1 and SN6 is cut, however, in this case the DC temperature signal would reach an abnormal high value outside of the predetermined range. Optionally, a min/max detector consisting of two comparator circuits would permit detection of any additional problem in the sensor and associated wiring circuit by comparing the DC temperature signals with predetermined upper and lower boundaries. Alternatively, other principles could be used, for example, the ABS ECU could be connected directly to the sensor during the resistance test and subsequently switched to the emulator circuit R6 when temperature measurement is in use.

During steady-state operation of the temperature sensing system of the present invention, the DC differential voltage signal shown in FIG. 13 between nodes SN3 and SN2 can be expressed as a ratio of the resistor values and the DC differential voltage between nodes SN1 and SN2, as follows:

$$V_{SN3} - V_{SN2} = (V_{SN1} - V_{SN2}) \times \frac{R5}{(R4 + R5)} \quad \text{Equation (2)}$$

Figure 13:
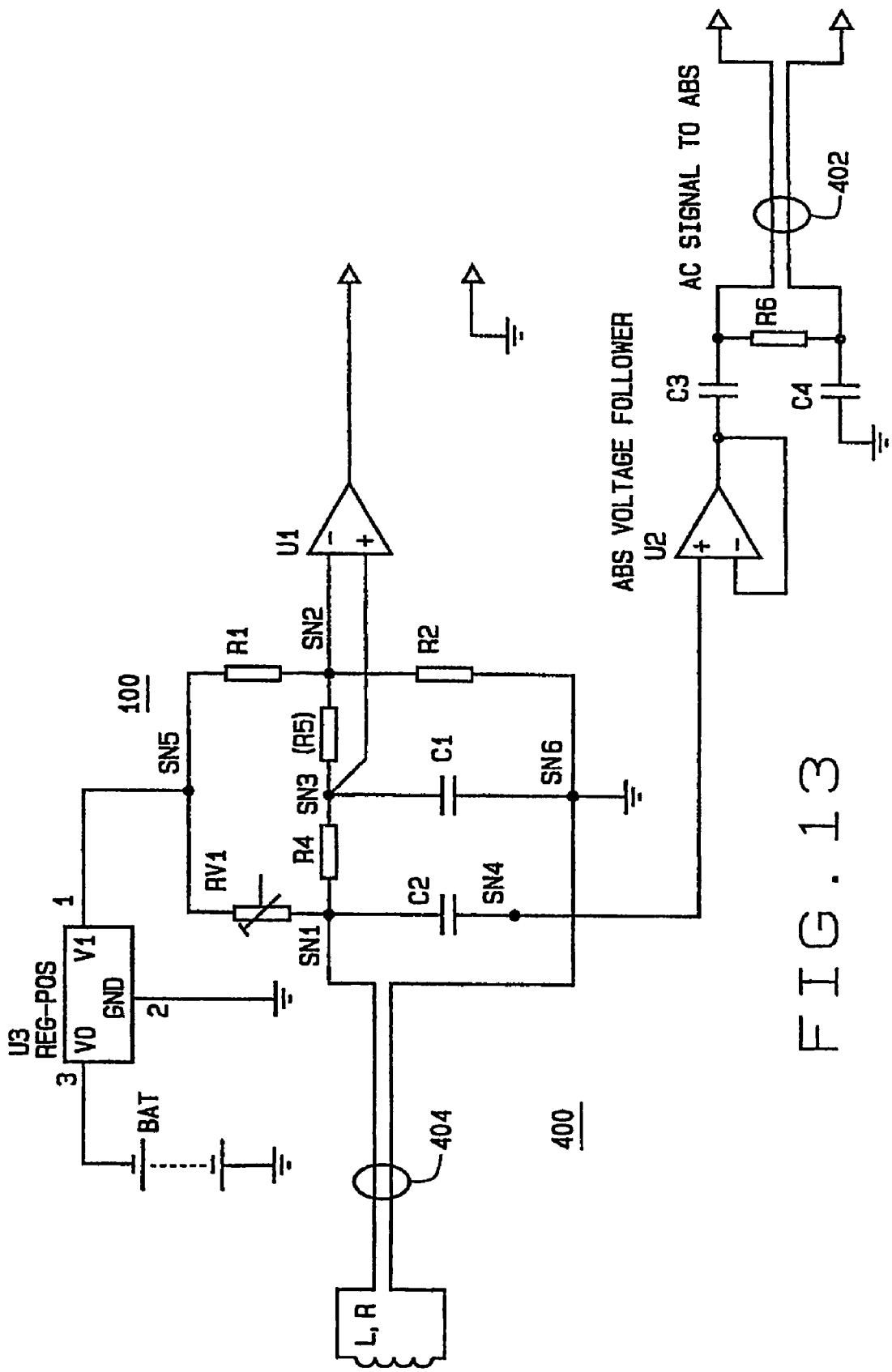
FIG. 13 is an alternate detailed electrical schematic representation of the embodiment of the present invention.

In this relation shown in Equation (2) between DC components, the potentiometric ratio R5/(R4+R5) permits adjustment of the scale factor a between temperature measurement units and the measured voltage, using the newly introduced resistor R5 (FIG. 13)

$$T = a \cdot (V_{DC}) + b \quad \text{Equation (3)}$$

where b is the bias that can be adjusted be the correct choice of R1, R2 and RV1 when the Wheatstone bridge circuit configuration is used as shown in FIGS. 8, 12, and 13. Equation 2 is valid when the temperature electronic circuit connected between nodes SN2 and SN3 has an infinite impedance. If not, just integer this impedance in parallel with R5 for the calculation.

Depending upon the particular temperature signal electronic treatment circuit connected after nodes SN2 and SN3, the temperature dependent DC voltage signal may be acquired directly from nodes SN3 and SN2, or may be compared to the electrical ground using a conventional differentiator circuit U1. The resulting output from the temperature sensing system 400 shown in FIG. 13 provides the original ABS or TCS magnetically induced AC voltage signal on at a separate point from the temperature dependant DC voltage signal, and cleanly extracts each signal from the other, thereby permitting the temperature sensing system 400 to be easily fitted to existing vehicle wiring systems. If required, depending upon the particular vehicle configuration, additional circuits, such as the voltage follower U2 and differentiator U1 may be provided to accommodate specific signal requirements for individual vehicle control modules.

For applications requiring only a determination of whether a predetermined maximum temperature limit has been reached, for example, to avoid damage to a wheel bearing, the differentiator circuit U1 on FIG. 13 can be replaced by a simple comparator to trigger an alarm device, alerting the driver of an abnormal temperature in a bearing. In this case the bias circuit consisting of resistor R1 and resistor R2 is set to define the upper temperature limit to trigger the alarm device.

In a further alternate embodiment, those of ordinary skill in electrical circuit design will recognize that the voltage follower U2 and associated components C3, C4, and R6 may be replaced by an LF transformer to perform an equivalent function.

For practical application in an vehicle, the temperature sensing systems 100, 200, 300 or 400 of the present invention can be readily adapted to couple between existing vehicle wheel bearing speed sensors and vehicle control modules, without altering existing vehicle wiring or modifying the vehicle control module. The present invention provides the original magnetically induced AC voltage signal, representative of vehicle wheel speed, to the vehicle control module without the superimposed temperature dependant DC voltage signal. For an alternative application, the vehicle control module may be modified to include the necessary electronic circuits to implement the temperature sensing system 100, 200, 300 or 400 of the present invention, again, without requiring additional vehicle wiring or a separate temperature sensor.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A temperature sensing system configured for use with a variable reluctance sensor consisting of an electrical conductor winding carrying a magnetically induced alternating current voltage signal, the temperature sensing system comprising:
   a set of electrical components operatively coupled in a Wheatstone bridge configuration with said electrical conductor winding, said set of electrical components including a plurality of resistors, and said Wheatstone bridge configuration operatively coupled to an electrical ground;
   a constant voltage source operatively coupled to said Wheatstone bridge configuration;
   a first capacitive filter circuit operatively coupled to a first node of said Wheatstone bridge configuration, said capacitive filter circuit configured to pass only the magnetically induced alternating current voltage signal from said electrical conductor winding: and
   a second capacitive filter circuit coupled to said node comprising at least one resistor and one capacitor, said second capacitive filter circuit configured to pass only a temperature dependant DC voltage signal from said electrical conductor winding;
   wherein said Wheatstone bridge configuration of said set of electrical components consists of five nodes coupled by seven branches;
   wherein the electrical conductive winding comprises a first of said seven branches;
   a capacitor is disposed on a second of said seven branches;
   a first resistor of said plurality of resistors is disposed on a third of said seven branches;
   a second resistor of said plurality of resistors is disposed on a fourth of said seven branches;
   a third resistor of said plurality of resistors is disposed on a fifth of said seven branches;
   a fourth resistor of said plurality of resistors is disposed on a sixth of said seven branches; and
   a fifth resistor of said plurality of resistors is disposed on a seventh of said seven branches.

2. The temperature sensing system of claim 1 further including a differentiator circuit operatively coupled to said second capacitive filter circuit and to a predetermined electrical potential, said differentiator circuit configured to output a temperature dependent DC voltage signal referenced to said predetermined electrical potential.

3. The temperature sensing of claim 1 wherein said predetermined electrical potential is said electrical ground.

4. The temperature sensing system of claim 1 wherein at least one said plurality of resistors is selected to provide bias adjustment of said DC voltage signal representative of said temperature, whereby said DC voltage signal has a predetermined value for a corresponding predetermined temperature.

5. The temperature sensing system of claim 1 wherein said first, third, and sixth branches are coupled a first of said five nodes;
said fourth, fifth, and seventh branches are coupled at a second of said five nodes;
said second, sixth, and seventh branches are coupled at a third of said five nodes;
said third and fifth branches are coupled at a fourth of said five nodes; and
said first, second, and fourth branches are coupled at a fifth of said five nodes.

6. The temperature sensing system of claim 5 wherein
said first capacitive filter circuit is operatively coupled to said first node;
said second capacitive filter circuit is operatively coupled between said second and third nodes;
said constant voltage source is operatively coupled to said fourth node; and
said electrical ground coupled to said fifth nodes.

7. The temperature sensing system of claim 6 wherein said second capacitive circuit is to provide said DC voltage signal representative of a temperature of the electrical conductor winding in a ratio of:

$$\frac{R5}{(R4+R5)}$$

wherein
R4 is the electrical resistance of said fourth resistor; and
R5 is the electrical resistance of said fifth resistor.

8. The temperature sensing system of claim 5 wherein said firtst, second, and third resistors are selected to provide bias adjustment of said DC voltage signal representative of said temperature, whereby said DC voltage signal has a predetermined value for a corresponding predetermined temperature.

9. The temperature sensing system of claim 1 wherein said first capacitive filter circuit consist of a first capacitor coupled at an input side to said first node of said Wheatstone bridge configuration.

10. The temperature sensing system of claim 9 wherein said first capacitive filter circuit further includes a voltage follower operatively coupled between an output side of said first capacitor and an input side of a second capacitor;
a resistor coupled between an output side of said second capacitor and an electrical ground; and
wherein said resistor is selected to have a normal electrical resistance substantially corresponding to the electrical of the electrical conductive winding of the reluctance sensor at an ambient temperature.

11. A temperature sensing system configured for use with a variable reluctance sensor consisting of an electrical conductor winding carrying a magnetically induced alternating current voltage signal, the temperature sensing system comprising:
a set of electrical components operatively coupled in a Wheatstone bridge configuration with said electrical conductor winding, said set of electrical components including at least a plurality of resistors, said Wheatstone bridge configuration operatively coupled to an electrical ground;
a constant voltage source operatively coupled to said Wheatstone bridge configuration;
a capacitive filter circuit operatively coupled to a first node of said Wheatstone bridge configuration, said capacitive filter circuit configured to pass only the magnetically induced alternating current voltage signal from said electrical conductor winding; and
a comparator circuit operatively coupled to said capacitive filter circuit and to a predetermined electrical potential, said differentiator circuit configured to output a temperature dependant DC voltage signal referenced to said predetermined electrical potential;
wherein said capacitive filter circuit consists of a first capacitor coupled at an input side to said first node of said Wheatstone bridge configuration.

12. The temperature sensing system of claim 11 wherein at least one of said plurality of resistors is selected to provide bias adjustment of said DC voltage signal representative of said temperature, whereby said DC voltage signal has a predetermined value for a corresponding predetermined temperature.

13. The temperature sensing system of claim 11 wherein said capacitive filter circuit further includes a voltage follower operatively coupled between an output side of said first capacitor and an input side of a second capacitor;
a resistor coupled between an output side of said second capacitor and a capacitive connection to an electrical ground; and
wherein said resistor is selected to have a nominal electrical resistance substantially corresponding to the electrical resistance of the electrical conductive winding at an ambient temperature.

14. A method for utilizing an electrical conductive winding generating magnetically induced alternating current voltage signals in a variable reluctance speed sensor as a temperature sensor, comprising the steps of:
supplying a constant voltage to the electrical conductive winding through a voltage drop resistor, said constant voltage superimposing a direct current voltage signal with said magnetically induced alternating current voltage, signal, said direct current voltage signal quasi-proportional to a temperature of the electrical conductive winding;
extracting, at a first output point, said temperature proportional direct current voltage signal from said superimposed direct current and alternating current voltage signal; and
extracting, at a second output point, said original alternating current voltage signal from said superimposed direct current and alternating current voltage signal;
said extracted temperature proportional direct current voltage signal with a predetermined voltage signal;
said predetermined voltage signal is representative of a temperature limit, and further including the step of;
signaling an alarm if said extracted temperature proportional direct current voltage signal represents a temperature which is at least equal to said temperature limit.

15. The method of claim 14 wherein said predetermined, voltage signal is an electrical ground.

16. A temperature sensing system configured for use with a variable reluctance sensor having an electrical conductor winding carrying a magnetically induced alternating current voltage signal, the temperature sensing system comprising:
- a drop resistor electrically coupled in series with said electrical conductor winding;
- a constant voltage source electrically coupled in closed loop series with said drop resistor and said electrical conductor winding;
- a capacitive filter circuit operatively coupled to a node point between said drop resistor and said electrical conductor winding, said capacitive filter circuit configured to output only the magnetically induced alternating current voltage signal from said electrical conductor winding; and
- a second capacitive filter circuit coupled to said node comprising at least one resistor and one capacitor, said second capacitive filter circuit configured to output only a DC voltage signal from said electrical conductor winding, said DC voltage signal representative of a temperature at said electrical conductor winding;
- further including an electrically resistive circuit operatively coupled in parallel with said constant voltage source;
- wherein said electrically resistive circuit includes first and second resistors electrically coupled in series; and
- wherein said first resistor, said second resistor, and said drop resistor are selected to obtain a DC voltage signal of a specific value for a specific temperature between said second capacitive filter circuit and a second node point between said first and second resistors.

17. The temperature sensing system of claim 16 further including a third capacitive filter circuit coupled to between said second node and said constant voltage source, said third capacitive filter circuit comprising at least one resistor and one capacitor, said third capacitive filter circuit configured to improve said DC voltage signal quality during a switch-on phase of said constant voltage source.

* * * * *

UNITED STATES PATENT AND TRADEMARK OFFICE
CERTIFICATE OF CORRECTION

PATENT NO. : 7,573,391 B2  Page 1 of 1
APPLICATION NO. : 10/575397
DATED : August 11, 2009
INVENTOR(S) : Christian Adam It is certified that error appears in the above-identified patent and that said Letters Patent is hereby corrected as shown below:

In Column 9, line 2 of Claim 7, after the word "is", and before the word "to", insert the word --configured--;

In Column 9, line 7 of Claim 10, after the word "a", and before the word "electrical", delete the word "normal" and insert the word --nominal--;

In Column 9, line 8 of Claim 10, after the word "electrical", insert the word --resistance--;

In Column 9, line 9 of Claim 10, after the word "the", and before the word "reluctance", insert the word --variable--.

Signed and Sealed this

Twenty-second Day of September, 2009

David J. Kappos
*Director of the United States Patent and Trademark Office*

UNITED STATES PATENT AND TRADEMARK OFFICE
CERTIFICATE OF CORRECTION

PATENT NO.        : 7,573,391 B2
APPLICATION NO.   : 10/575397
DATED             : August 11, 2009
INVENTOR(S)       : Christian Adam Page 1 of 1

It is certified that error appears in the above-identified patent and that said Letters Patent is hereby corrected as shown below:

In Column 9, line 35, Claim 7, after the word "is", and before the word "to", insert the word --configured--;

In Column 9, line 62, Claim 10, after the word "a", and before the word "electrical", delete the word "normal" and insert the word --nominal--;

In Column 9, line 63, Claim 10, after the word "electrical", insert the word --resistance--;

In Column 9, line 64, Claim 10, after the word "the", and before the word "reluctance", insert the word --variable--.

This certificate supersedes the Certificate of Correction issued September 22, 2009.

Signed and Sealed this

Twenty-seventh Day of October, 2009

David J. Kappos
*Director of the United States Patent and Trademark Office*